United States Patent [19]

Borzym

[11] 4,437,374
[45] Mar. 20, 1984

[54] TUBE CUTTING APPARATUS

[76] Inventor: John J. Borzym, 4820 Schoolbell La., Birmingham, Mich. 48010

[21] Appl. No.: 461,850

[22] Filed: Jan. 28, 1983

Related U.S. Application Data

[60] Division of Ser. No. 270,298, Jun. 4, 1981, Pat. No. 4,392,644, which is a continuation of Ser. No. 119,241, Feb. 7, 1980, Pat. No. 4,294,147.

[51] Int. Cl.³ .................... B23D 21/00; B23D 25/04
[52] U.S. Cl. ............................... 83/454; 83/456; 83/466; 83/700; 269/87.2; 269/234
[58] Field of Search ............... 83/294, 319, 320, 382, 83/454, 456, 519, 54, 700, 466; 269/234, 235, 87.2

[56] References Cited

U.S. PATENT DOCUMENTS

| | | | |
|---|---|---|---|
| 1,800,005 | 4/1931 | Braun | 83/294 |
| 2,850,926 | 9/1958 | Jobe | 269/234 |
| 3,938,415 | 2/1976 | Borzym | 83/385 |

*Primary Examiner*—James M. Meister
*Attorney, Agent, or Firm*—Krass, Young & Schivley

[57] ABSTRACT

A ram driven tube cutting apparatus of the double cut type in which sections of tubing are successively severed from a continuous length thereof by a notching cut followed by a severing cut, includes improved mechanism for clamping the tubing during the cutting process. A pair of opposed, complemental die jaws are mounted on slides controlled by spaced cam followers carried by the slides. A reciprocating wedge cam engages and forces the cam followers apart to move the slides thereby closing the jaws on the tubing. One of the cam followers comprises a roller mounted on an eccentric shaft which may be selectively rotated to adjust the clearance between the die jaws. The other cam follower is spring loaded toward the cam within a slide mounting provided in its slide and automatically shifts to an overload position to avoid damage to the mechanism when foreign objects become lodged between the die jaws. Each of the die jaws consists of a pair of die jaw portions having spaced, opposed forces defining a slot through which a severing blade may pass. The die jaw portions are removably mounted on the slides by bolts anchored with trap nuts slidably confined within a T-shaped passageway in the slides to permit adjustment of the spacing between opposed faces of the die jaw portions.

7 Claims, 8 Drawing Figures

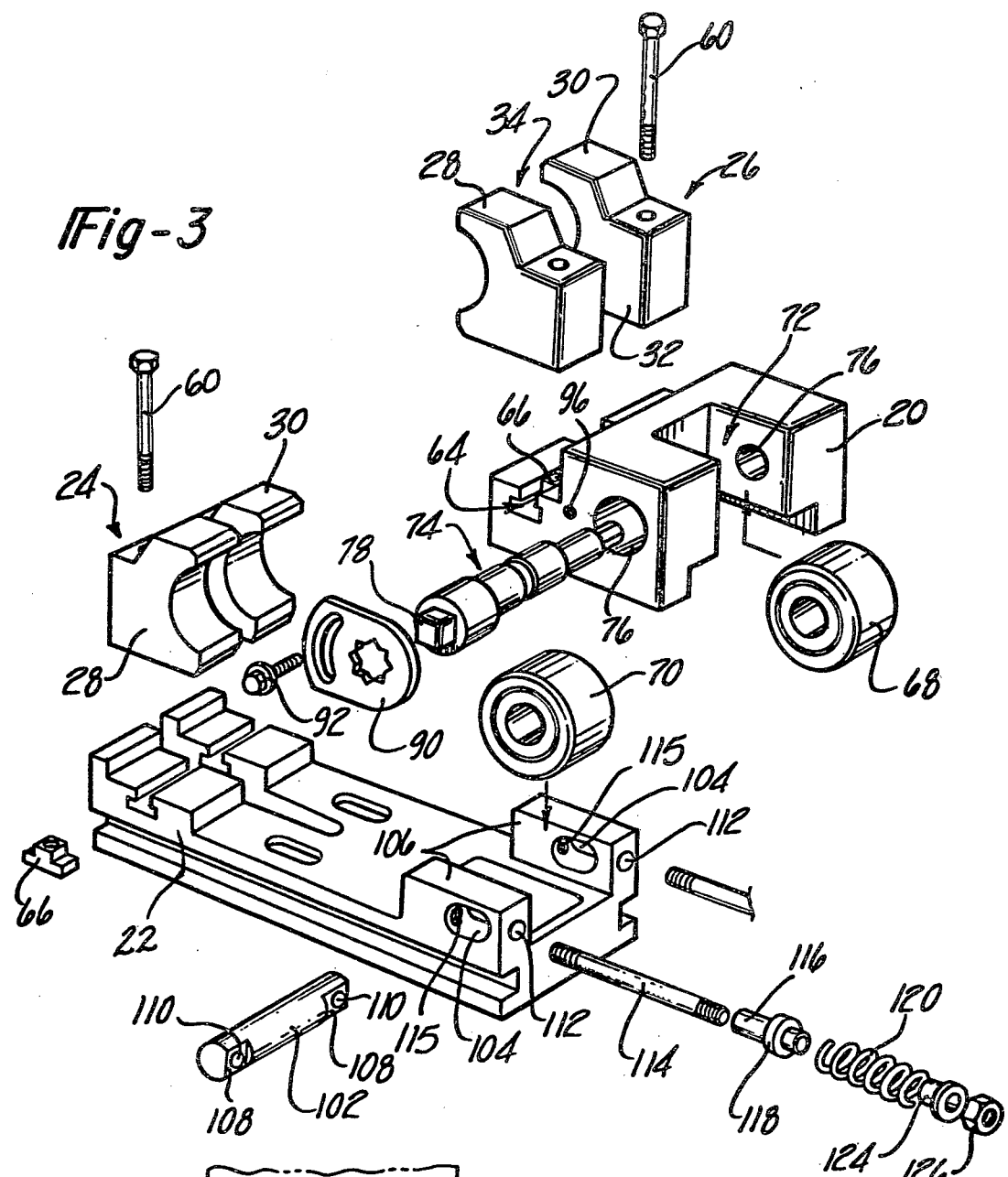
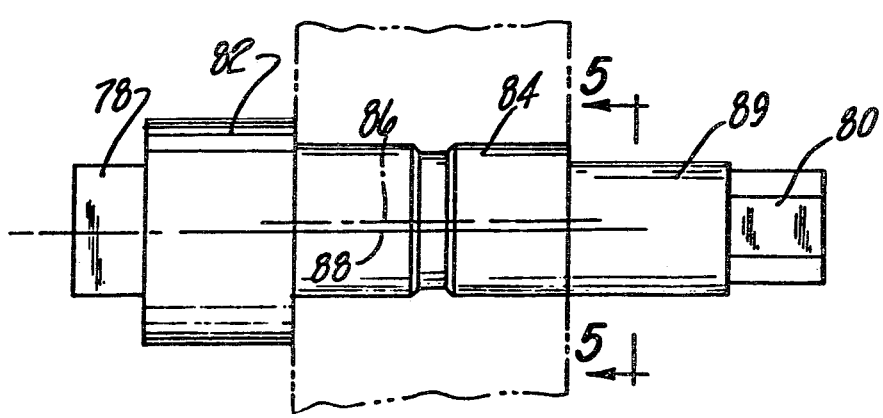

TUBE CUTTING APPARATUS

This application is a division of application Ser. No. 270,298, filed June 4, 1981 now U.S. Pat. No. 4,392,644 which is a continuation application Ser. No. 119,241, filed Feb. 7, 1980, now U.S. Pat. No. 4,244,147.

BACKGROUND OF THE INVENTION

I. Technical Field

This invention generally relates to tube cutting apparatus of the type employed to sever sections of a continuous length of tubing or similar enlongated stock emanating from a source thereof such as a mill and in which a cut-off die set driven by a swinging ram assembly is clamped to the continuous length of tubing prior to and during the severing operation. More particularly, the present invention is directed to improvements in the tube clamping mechanism which allow simple, rapid adjustment of the die clamping jaws while eliminating possible damage to such mechanism when foreign objects become lodged between the jaws.

II. Description of the Prior Art

Tube cutting apparatus of the general type mentioned above is well known in the art as is exemplified by U.S. Pat. Nos. 3,938,415 and 4,108,029 owned by the assignee of the present invention, the entire disclosures of which patents are hereby incorporated by reference herein. While the prior art machines disclosed in these patents are both highly efficient and are well suited for their intended purpose, certain aspects thereof are nevertheless subject to improvement as will be discussed more fully hereinunder.

Tube clamping mechanism of the prior art machines noted above consists of a pair of opposed, complemental die jaws for clamping the tubing, which are removably mounted by bolts on corresponding, slidable die jaw holders or slides. A pair of opposing roller members forming cam followers are respectively rotatably mounted on the slides and are adapted to be slidably engaged and laterally displaced by a wedge cam carried by a vertically reciprocable ram assembly. Outward lateral displacement of the cam followers away from the cam produces closing of the die jaws to clamp the tubing. The clearance between the die jaws in their closed, clamping position is therefore directly dependent on the magnitude of displacement of the cam followers produced by the cam; more or less than the proper amount of die jaw clearance will result in the application of either too much or too little clamping force on the tubing. Inadequate clamping force may permit the tubing to twist within the jaws during the cutting process, thereby reducing the quality of the cut, while excessive clamping force may damage thin wall type tubing or may result in damage of certain components of the clamping mechanism itself.

Die jaw clearance is largely determined by the cumulative manufacturing tolerances of the various mechanical components which communicate force from the cam to the die jaws. While the tolerances of such components may be closely controlled during the manufacturing thereof in order to achieve a specific die jaw clearance, narrow manufacturing tolerances naturally increase production costs and therefore should desirably be maintained as broad as possible. In any event, wear on the components over an extended period of die increases the cumulative tolerance, thereby increasing die jaw clearance beyond an acceptable level.

Another problem sometimes experienced in connection with the prior art machines involves mechanical failure of the clamping mechanism in the event that foreign objects or articles become lodged between the die jaws upon closing thereof. It is not entirely uncommon, for example, for metal parts or shaving to be carried along with the advancing tubing into the die jaws; such foreign articles become wedged between the tubing and the die jaws when the latter are closed during the clamping sequence. In this case, the force loading imposed on the various components transmitting the clamping force from the cam to the jaws may result in mechanical failure thereof. Because the cam followers are provided in the form of rollers mounted on stationary axles, at least one of such axles usually shears away from its mounting on corresponding slide when the die jaws are "jammed" by a foreign article, thus requiring repair which necessitates shut down of the machine.

The die jaws associated with the prior art machines each consist of a pair of die jaw portions removably mounted on one of the slides. Each pair of die jaw portions includes essentially flat, opposing, spaced apart faces forming a slot through which the severing blade may pass during the cutting operation. Due to wear, the die jaw portions must be periodically removed from the machine and the opposed faces thereof reground to a smooth surface finish. Since the spacing between the opposing faces of the die jaw portions is relatively critical in achieving clean cuts, the die jaw portions are mounted for sliding adjustment on their slides in order that the die jaw portions may be moved closer together as material from the opposed faces thereof is removed during repeated grinding operations. The expedient previously resorted to for providing the necessary adjustability of the die jaw portions consists of elongating the base of each die jaw portion in order to accommodate an elongate slot and which is provided in such base. A stationary bolt trained through the slot is threadably received in the slide; in this manner, the die jaw portions are slidable toward and away from each other relative to the slide upon which they are mounted. Tightening of the adjustment bolts fixes the position of the die jaw portions on the slide. This approach to the problem of providing adjustment of the die jaw portions is less than completely satisfactory from a manufacturing standpoint however, since elongation of the base of each die jaw portions adds to the material cost of the machine.

As an improvement over prior art machines, one feature of the present invention resides in the provision of a means for rapidly and conveniently adjusting the clearance between the die jaws, which not only allows manufacturing tolerances of the individual components to be relaxed, but alco compensates for wear of the components after an extended period of machine use. Moreover, the provision of a convenient means of adjusting the die jaw clearance readily permits altering die jaw pressure, which is especially useful in compensating for variations in the characteristics of the particular tubing being cut, such as minor variations in the outside diameter thereof.

Another significant aspect of the invention lies in the provision of a means of preventing excessive force from being communicated from the cam through the various clamping components to the die jaws; by this feature the necessity for replacement of components damaged by overload forces, and concomitant down time of the machine for repair are eliminated.

Finally, yet another aspect of the invention relates to novel means for adjustably mounting the die jaw portions on their slides in a manner which reduces the quantity of metal employed to form each of the die jaw portions.

SUMMARY OF THE INVENTION

In accordance with the present invention, an improved, ram driven tube cutting apparatus of the double cut type is provided in which sections of tubing are successively severed from a continuous length thereof using a notching blade whose operation is followed by a severing blade. Improved mechanism for clamping the tube during the cutting process comprises a pair of opposed, complemental die jaws respectively mounted on slides controlled by a pair of spaced cam followers carried by corresponding ones of the slides. A reciprocating wedge cam engages and forces the cam followers apart to move the slides, thereby closing the jaws on the tubing. One of the cam followers comprises a roller mounted on an eccentric shaft which may be selectively rotated to adjust the clearance between the die jaws. A locking plate drivingly coupled with one end of the eccentric shaft permits rotation thereof between any of a plurality of positions corresponding to different clearance distances between the die jaws. The other cam follower also consists of a roller carrier by a shaft which is spring loaded toward the cam and is slidably mounted on its corresponding slide. The spring loaded, slidably mounted cam follower automatically shifts to an overload position to avoid damage thereto when excessive force is applied by the cam to the cam followers as a result of a foreign object becoming lodged between the die jaws. Each of the die jaws consists of a pair of die jaw portions having spaced, opposed faces defining a slot through which the severing blade may pass during the cutting operation. Each die jaw portion is removably mounted on one of the slides by a bolt which is secured thereto and is anchored by a trap nut slidably confined in a T-shaped passageway in the corresponding slide; loosening of a bolt from the nut permits the die jaw portion to be slidably adjusted along the length of the passageway in order to vary the distance between opposing faces of the die jaw portions.

BRIEF DESCRIPTION OF THE DRAWINGS

In the drawings, which form an integral part of the specification and are to be read in conjunction therwith, and in which like components are designated by identical reference numerals and the various views:

FIG. 3 is an exploded view of the clamping mechanism associated with the apparatus of FIG. 1;

FIG. 4 is a longitudinal, elevational view of the eccentric shaft shown in operative relationship to portions of the associated cam follower which is indicated in the phantom;

DETAILED DESCRIPTION OF THE INVENTION

Figure 1:
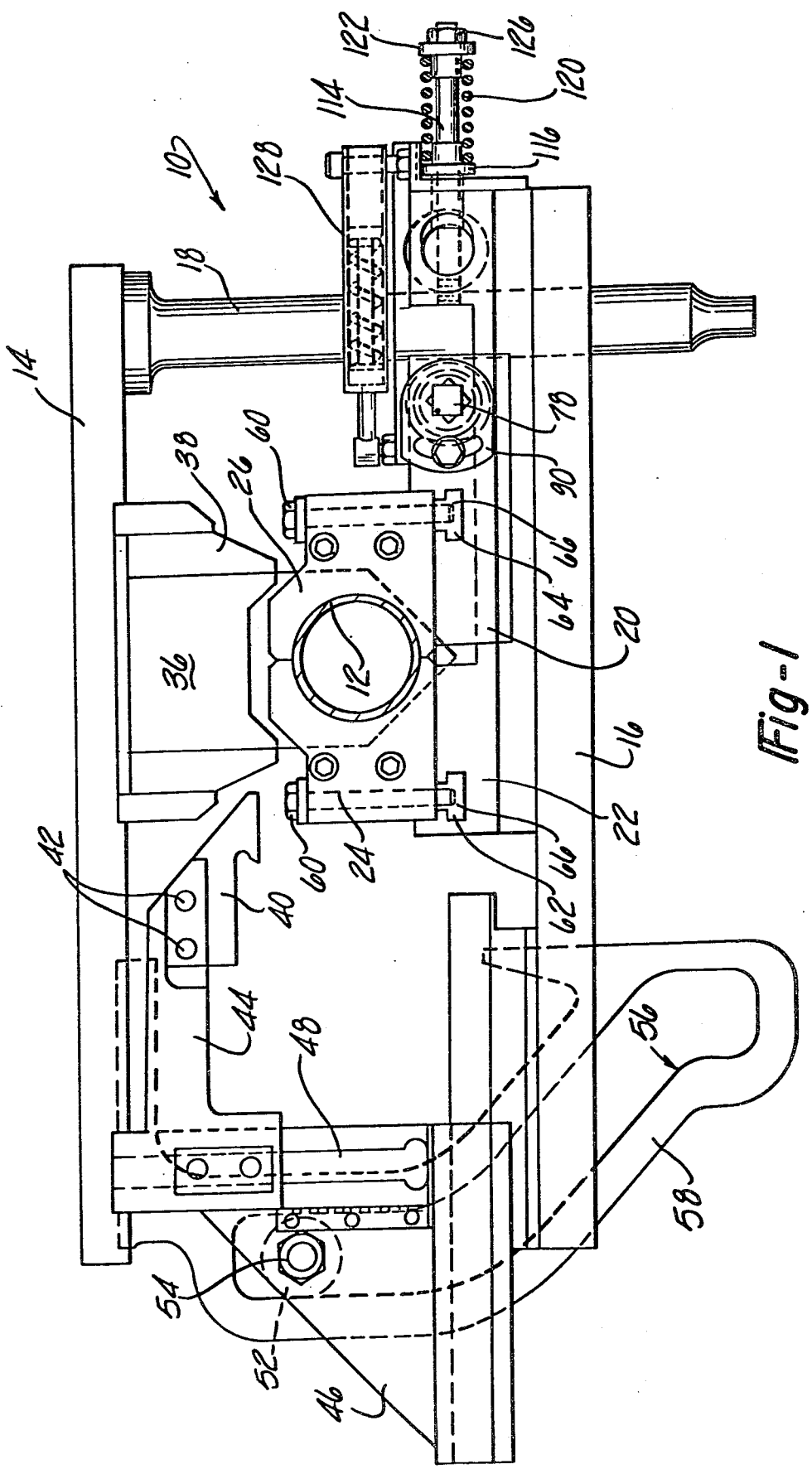
FIG. 1 is a front elevational view of the improved tube cutting apparatus comprising the preferred embodiment of the present invention, with the clamping mechanism shown in the closed, clamping position thereof, and in operative relationship to a length of tubing during severing thereof.
Figure 2:
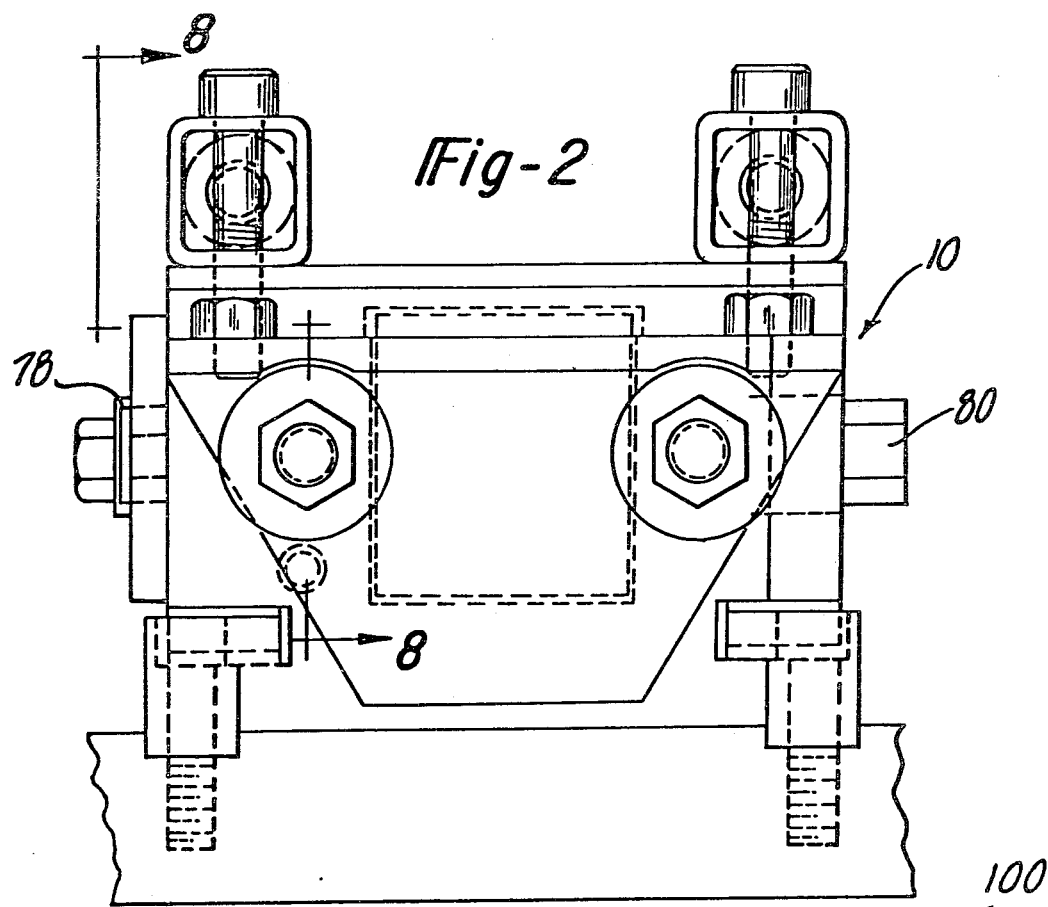
FIG. 2 is a fragmentary side view of the apparatus depicted in FIG. 1.
Figure 5:
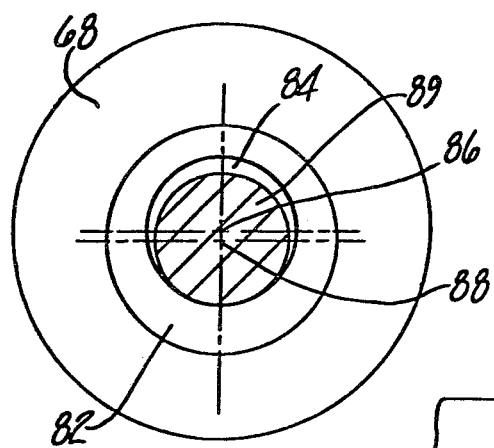
FIG. 5 is a cross sectional view taken along the line 5—5 in FIG. 4.

Referring now to the drawings, improved tube cutting apparatus in accordance with the present invention comprises a die set generally designated by the numeral 10 which is adapted to be mounted within a die press or the like (not shown) within which the die set 10 is mounted so as to be slidable along a rail set (not shown) within the press. The press normally includes a swinging or orbiting type ram mechanism which serves to drive the die set 10. Die sets of the general type with which the present invention is concerned operate by the ram mechanism first causing later discussed clamping jaws within the die set 10 to be operated to clamp the same to a rapidly moving length of the tubing 12, with the cut-off apparatus being positioned to receive the elongated tubing stock as the latter eminates from a source (not shown) thereof, such as a fabrication mill. The die set 10, being clamped to the moving tubing 12, moves with the latter along the rail set while the ram mechanism drives a main guillotine type severing blade in a reciprocating fashion which shears off a slug from the tubing 12, thereby severing a length of such tubing. The cut off operation as described above is normally preceded by a notching operation wherein a notching blade is driven through a portion of the periphery of the tubing 12 in the plane of the severing blade in order to cut a notch in the periphery of the tubing 12 which facilitates a clean cut by the severing blade. The ram mechanism is then operated in a reverse manner to complete the cycle, i.e. the severing blade is retracted and the die set 10 is unclamped from the tubing 12 whereupon the die set 10 is returned on the rail set to its starting position, prior to the initiation of a new cut-off cycle.

Those skilled in the art will recognize that the features of the machine described immediately above are well known in the art, so that a detailed description thereof is not necessary herein for a proper understanding of the improved tube cutting apparatus of the present invention.

The die set 10 includes a ram assembly 14 which is vertically spaced from, and reciprocable relative to, a base 16. Ram assembly 14 includes a wedge type cam 18 which is secured thereto depends downwardly therefrom.

First and second slide means, respectively designated by the numeral 20 and 22, are slidably mounted on the base 16 for horizontal reciprocating movement relative to each other upon operation of the ram assembly 14. First and second slide means 20 and 22 have die jaw holders respectively formed integral therewith for mounting a pair opposed, complemental die jaws 24 and 26. Die jaws 24 and 26 each include an arcuately shaped clamping portion contoured to conform to the exterior shape of the tubing 12. Each of the die jaws 24 and 26 includes a pair of die jaw portions 28 and 30, each pair of such die jaw portions 28 and 30 including spaced, opposed, parallel faces 32 defining a gap or slot 34 through which a severing blade 36 may pass. Severing blade 36 is mounted on the lower surface of ram assembly 14 by means of a blade holder assembly 38.

A slotting blade 40 is mounted by means of cap screws 42 to one extremity of a blade holder 44, which in turn is slidably mounted on a cross slide 46 by means of a key (not shown) on the blade holder 44, such key being confined within a vertically extending guide slot 48 in the cross slide 46.

Cross slide 46 is mounted for horizontal reciprocation in a direction perpendicular to the travel of tubing 12 by means of a slide rail 50. A cam roller 53 is mounted by nut 54 to cross slide 46 and is confined for movement on the inside track 56 of a curved cam 58, the upper extremity of cam 58 being secured to ram assembly 14.

Each of the die jaw portions 28 and 30 associated with die jaws 24 and 26 are removably secured by a threaded bolt 60 to the corresponding first and second slide means 20 and 22. The bolt 60 associated with die jaw 24 extend through vertical bores in the die jaw portions 28 and 30 downwardly into a T-shaped passageway 62 in upper surface areas of the second slide means 22. Similarly, die jaw portions 28 and 30 related to die jaw 26 are each provided with vertical bores therethrough for slidably receiving the bolts 60 therewithin, the lower threaded extremities of which extend downwardly into the T-shaped passageway 64 defined in upper surface areas of first slide means 20. Each of the passageways 62 and 64 extend completely through the corresponding slide means 20 and 22 respectively, in a direction perpendicular to the path of sliding movement of such slide means. A T-shaped trap nut 66 is threadably attached to the lower ends of the bolts 60 and is slidably confined within the corresponding passageway 62 or 64. Trap nuts 66, by virtue of their shape and configuration which corresponds to that of the passageways 62 and 64, slidably mount the die jaw portions 28 and 30 on the corresponding slide means 20 or 22. It may be appreciated upon tightening of the bolts 60, the die jaw portions 28 and 30 are stationarily held to the corresponding slide means while loosening of the bolts 60 frees the trap nuts 66 for sliding movement within the passageways 62 and 64 to permit sliding of the die jaw portions 28 and 30 thereby allowing adjustment of the distance between the opposing faces 32 defining slot 34. The die jaw portions 28 and 30 may be completely removed from the die set 10 simply by unscrewing and removing the bolt 60 from the trap nuts 66. Thus, it is apparent from the foregoing that a novel means for adjustably securing the die jaws 24 and 26 to the corresponding slide means 20 and 22 has been provided which eliminates the necessity for elongation of the base of each die jaw portion in order to provide a slot therein.

The die set 10 further comprises a first and second cam follower respectively associated with the slide means 20 and 22, herein disclosed a cylindrically shaped rollers 68 and 70. Roller 68 is mounted for rotation within a cut-out 72 by means of an eccentric shaft 74 which is journaled within a pair of spaced bores 76 in the first slide means 20.

Eccentric shaft 74 is provided with a square or toothed drive member 78 and a nut 80 on the respective opposite ends thereof which each extend outwardly beyond the first slide means 20. Eccentric shaft 74 further includes, between the drive members 78 and nut 80, a circularly shaped large bearing 82 adapted to slidably contact the inner surface areas of the first silde means 20 defining one of the bores 76, and a circularly shaped eccentric portion 84 whose longitudinal axis 86 is eccentric with respect to the longitudinal axis 88 of the shaft 74. Eccentric portion 84 of eccentric shaft 74 is disposed within cut-out 72 and rotatably mounts the roller 68 thereon. Finally, eccentric shaft 74 also includes a small, circularly shaped bearing 88 between the nut 80 and eccentric portion 84 which is adapted to slidably engage the inner surface areas of first slide means 20 defining the other of the spaced bores 76. A locking plate 90 is secured on one side of the first slide means 20 adjacent one extremity of eccentric shaft 74 by means of a threaded screw 92 which passes through an arcuately shaped slot 94 in the locking plate 90 and is threadably connected within a threaded hole 96 in first slide means 20. Locking plate 90 is provided with an aperture therein defined by a plurality of angularly shaped notches 100 around the periphery of such aperture. The notches 100 and locking plate 90 interchange with the toothed drive member 78 and provide a plurality of choices of rotational positions of eccentric shaft 74 with respect to the locking plate 90. Locking plate 90 may be rotated in either angular direction approximately 20° in order to adjust the rotational position of eccentric shaft 74 a like amount.

Means for mounting the roller 70 on the second slide means 22 in a manner which prevents force overload of the components of the clamping mechanism include a reciprocably mounted axle 102 having the opposite extremities thereof slidably confined within corresponding slots provided in the spaced, upstanding ears 106 of second slide means 22. Axle 102 includes a flatened surface area 108 on the opposite ends thereof as well as a corresponding pair of apertures 110 which extend transversely therethrough in alignment with the flatened surfaces 108. Apertures 110 are respectively aligned with a pair of bore holes 112 in one end of each of the ears 106 and extend beyond the slots 104. A pair of guide rod members 114, the extremities of each of which are threaded, extend through the bore holes 112, aperture 110, and are threadably received in thread bores 115 in order to slidably mount the axle 102 within the slots 104. An inner bushing 116 sleeved over each of the guide rod members 114 extends into the bore holes 112 and contact the flat surface areas 108 of the axle 102. Inner bushings 116 include an annular collar 118 against which there is seated one end of a compression spring member 120 which is also sleeved over each of the guide rod members 114 and is compressed between the annular collar 118 and a similar collar 122 of an outer bushing 124, the combination of bushings 116 and 124, along with compression spring 120 being loaded onto the guide rod members 114 and retained thereon by means of a nut 126 threadably received on the outer extremities of the guide rod members 114. At this point, it may be appreciated that roller 70 is rotatably mounted on axle 102, which in turn is mounted for reciprocable movement within the slot 104; compression springs 20 load the bushings 116 into contact with the flat surface areas 108 of axle 102 in order to bias the latter inwardly within the slots 104 toward the wedge cam 18.

A spring loaded tension device 128 has the opposite ends thereof respectively secured to portions of first and second slide means 20 and 22 in order to urge each of the latter to slide in a direction which produces opening of the die jaws 24 and 26.

Turning now to a description of the operation of the improved tube cutting apparatus, the first step in the machine cycle for cutting off a given length of the tube 12 consists of vertically shifting the ram assembly 14 downward from its normally raised position. As the ram assembly 14 travels downward, the exterior surface areas of cam 18 slidably engage the rollers 68 and 70 causing the latter to be laterally displaced in opposite horizontal directions. This camming action is translated to the first and second slide means 20 and 22 which slide relative to each other to produce closing of the die jaws 24 and 26, thereby clamping the tubing 12 therebetween. At this point, as described in U.S. Pat. No. 4,108,029, severing blade 36 is substantially spaced above the tubing 12 and slotting blade 40 is disposed in a lowered cutting position near the periphery of the tubing 12 and on one side of the latter adjacent die jaw 26. As the ram assembly 14 continues its downward travel, the cam 58 and associated roller 52 translate this vertical motion into horizontal motion which is imparted to the cross slide 46. Cross slide 46 moves toward the left, as viewed in FIG. 1, at this stage of operation, thereby pulling the slotting blade 40 into cutting engagement with the periphery of tubing 12 to produce a slot in such tubing aligned with the plane through which the severing blade 36 will subsequently travel. The previously discussed key (not shown) on the blade holder 44 travels within the guide slot 48 to resist blade reaction during this notching stroke. Further downward travel of the ram assembly 14 draws the slotting knife 40 to the opposite side of tubing 12 and into an elevated clearing position above the tubing 12 in order to permit unimpeded return thereof to a home position on the opposite side of tubing 12. Continued downward movement of ram assembly results in the severing blade 36 entering the slot in tubing 12 produced by the slotting blad 40 and eventually completely severs the tubing 12 before the downward stroke of ram assembly 14 is completed.

As the ram assembly 14 undertakes its upward return stroke and severing blade 36 is raised above the horizontal return path of the slotting blade 40, the slotting blade 40 is returned to its home position. Near the end of the return stroke of ram assembly 14 rollers 68 and 70 disengage cam 18 and die jaws 24 and 26 shift away from each other to unclamp the severed length of tubing 12 by virtue of the biasing influence of tension device 128. The entire die set 10 is then returned on rail sets to a starting position and the cycle described above is repeated.

Figure 6:
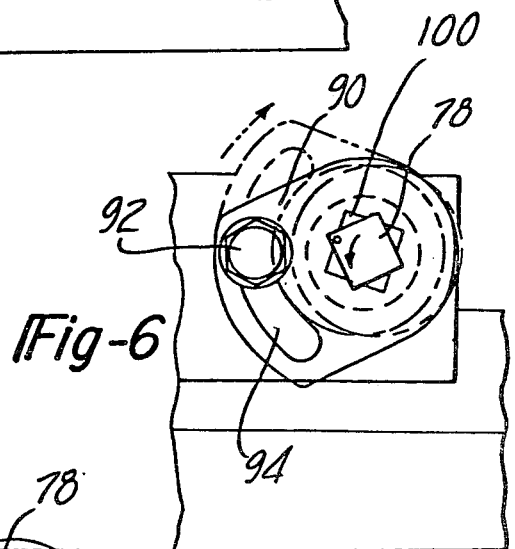
FIG. 6 is an enlarged, fragmentary front view of one end of the eccentric shaft shown in interengagement with a locking plate, an alternate adjustment position of the locking plate being indicated in the phantom.
Figure 7:
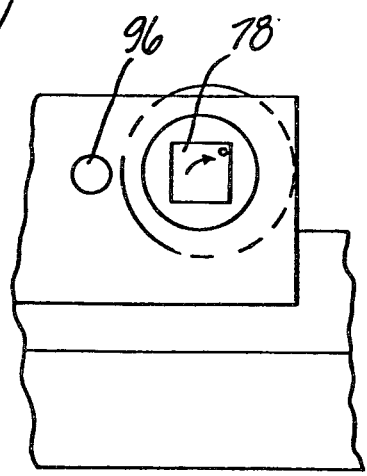
FIG. 7 is a view similar to FIG. 6, but showing the locking plate removed from the end of the eccentric shaft to allow repositioning of the latter with respect to the locking plate.

During initial set up an adjustment of the die set 10, or after an extended period of use thereof, the relative lateral positions of die jaws 24 and 26 (and thus, the clearance therebetween) may be rapidly and conveniently adjusted by virtue of the eccentric shaft 74. For example, assuming it is necessary to adjust the clearance between the opposing clamping surfaces of the die jaws 24 and 26, threaded screw 92 is loosened slightly and locking plate 90 is pivoted in either angular direction; locking plate 90 may be rotated in this manner a total of approximately 22° in either angular direction (and thus, a total of approximately 45° in one angular direction). For example, as best seen in FIG. 6, the locking plate 90 may be pivoted in the direction of the arrow approximately 45° from the positions thereof respectively represented by the full and broken lines. As the locking plate 90 is rotated, threaded screw 92 remains stationary and slidably engages the locking plate 90 to prevent the latter from becoming disengaged with the drive member 78. As the locking plate 90 is rotated, drive member 78, and thus the entire eccentric shaft 74, is likewise rotated causing eccentric portion 84 to shift the lateral position of roller 68 in the well known manner. This adjustment in the lateral position of roller 68 is translated through the first slide means 20 to the die jaw 26. In the event that adjustment of the die jaw clearance greater than that provided by 22° of rotation of the locking plate 90 is desired, the toothed drive member 78 may be repositioned in the alternate set of notches 100 simply by removing the threaded screw 92, and disengaging the locking plate 90 from the drive member 78, followed by repositioning the drive member 78 in the alternate set of notches 100 and then replacing the threaded screw 92.

Figure 8:
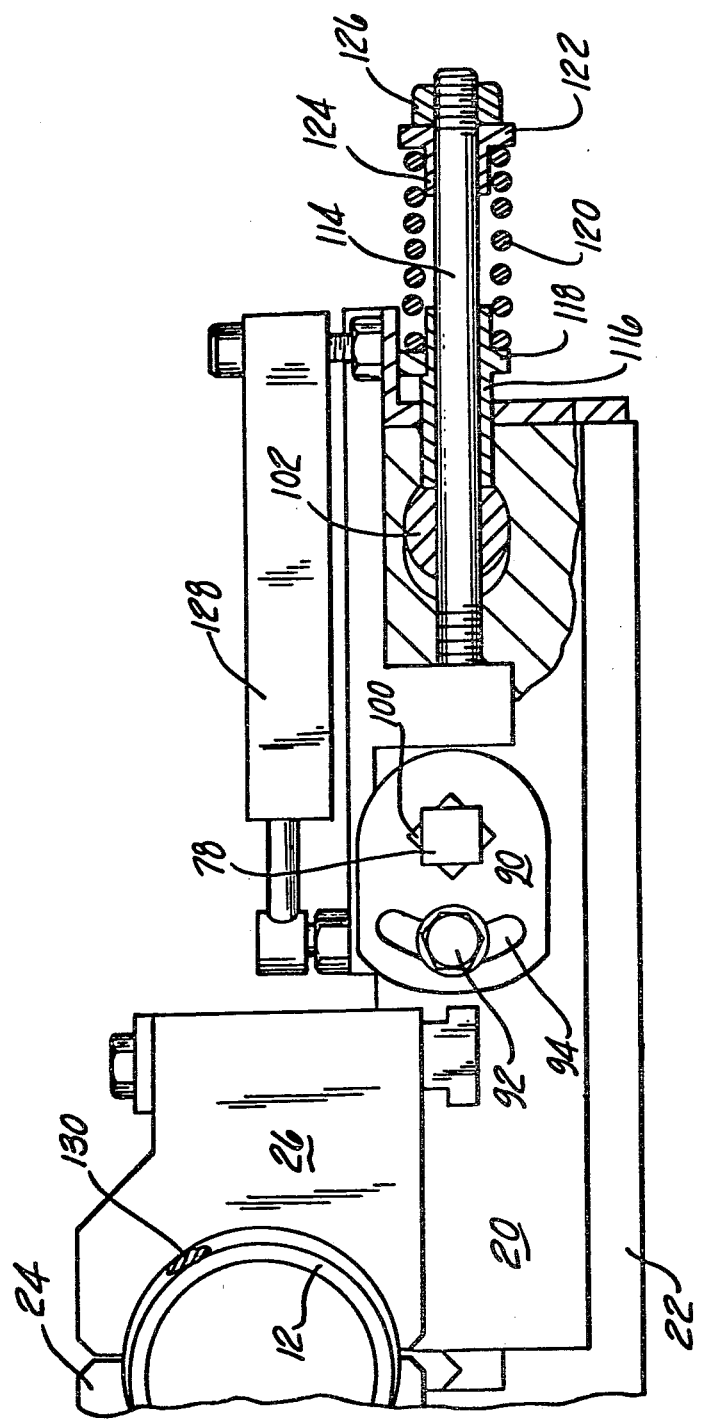
FIG. 8 is a sectional view taken along the line 8—8 in FIG. 2, showing a foreign object lodged between the tubing and one of the die jaws with the shaft carrying one of the cam followers having been shifted to an overload position.

A further significant feature of the present invention involves the provision of means for limiting the force which is transferred from the cam 18 through the rollers 68 and 70 to the die jaws 24 and 26. This means for limiting force transfer through the rollers 68 and 70 includes a means for mounting the roller 70 for lateral sliding motion toward and away from the cam 18, and between a normal operating position and a overload position, and further comprises means for biasing the roller toward the normal position adjacent cam 18. The mounting means referred to immediately above consists of the guide rod members 114 along with axle 102 and elongate slots 104 in the second slide means 22. Biasing means in the nature of spring member 120 applies biasing pressure to the axle 102 through bushing 116 in order to urge the axle 102 (and thus the roller 70) to assume a normal operating position, engageable with the cam 18 upon the downward stroke of ram assembly 14. In the event that a foreign object indicated by the numeral 130 in FIG. 8 becomes lodged either between the die jaws 24 and 26 or between the tubing 12 and one of the die jaws, complete closing of the die jaws is prevented, in which case the lateral, or horizontal component of force imparted to the rollers 70 by the cam 18 exceeds the biasing force of spring 120 whereupon axle 102 shifts laterally outward within the slots 104 to an overload position in which roller 70 is removed from engagement with the cam 18. This provision for lost motion prevents overload of the forced transmitting components of the clamping mechanism and resultant damage thereto.

From the foregoing, it is apparent that the improved tube cutting apparatus as described above not only provides for the reliable accomplishment of the objects of the invention but does so in a particularly efficient and reliable manner. It is recognized, of course, that those skilled in the art may make various modifications or additions to the preferred embodiment chosen to illustrate the invention without departing from the scope and spirit of the present contribution to the art. Accordingly, it is to be understood that the protection sought and to be afforded hereby should be deemed to extend to the subject matter claimed and all equivalents thereof fairly within the scope of the invention.

What is claimed is:

1. Apparatus for severing an elongate workpiece, comprising:
   a blade for severing said workpiece;
   a pair of opposed jaws for clamping said workpiece therebetween;

first and second means for respectively mounting said die jaws for reciprocating movement toward and away from each other between an open release position and a closed clamping position;

cam means coupled with said mounting means for applying a preselected value of force to said first and second mounting means whereby to cause said jaws and said mounting means to shift to said closed position thereof; and means coupled with said cam means for limiting the magnitude of force applied by said cam means to said first and second mounting means to said preselected value thereof.

2. The apparatus of claim 1, wherein said first and second mounting means each include a slide member upon which a corresponding jaw is mounted and said cam means includes a pair of spaced apart cam followers respectively mounted on the slide members and a cam adapted to be selectively wedged between said cam followers.

3. The apparatus of claim 2, wherein said force limiting means includes:

means for mounting one of said cam followers for shifting toward and away from the other of said cam followers between a normal operating position and an overload position, and biasing means for applying a preselected magnitude of force on said one cam follower to urge the latter to remain in said normal operating position thereof, said one cam follower being shiftable to said overload position thereof when the level of force imposed thereon by said cam exceeds said preselected value thereof whereby to prevent overloading said one cam follower.

4. The apparatus of claim 3, wherein said means for mounting said one cam follower includes:

a shift upon which said one cam follower is mounted, and guide means for receiving and guiding the movement of said shaft therein.

5. The apparatus of claim 4, wherein said guide means includes:

at least one slot in one of said slide members;

a rod member secured to said shaft and extending transversely thereto, and means for slidably mounting said rod member on said one slide member.

6. In a die set for severing an elongate workpiece and of the type having the combination of a pair of opposed complemental die jaws for clamping the workpiece, each of the die jaws including a pair of spaced apart die jaw portions defining a slot through which a severing blade may pass, and a pair of die jaw holders having said die jaw slideably mounted thereon and respectively mounting said pair of die jaws for movement toward and away from each other, the improvement comprising:

a pair of ways respectively in said pair of said die jaw holders, each of the ways extending transverse to said slot;

a locking member secured to each of the die jaw portions and communicating with the corresponding way; and means slideably confined with each of said ways for selectively securing said locking member at a desired location along said way whereby to permit adjustment of the spacing between said die jaw portions.

7. The improvement of claim 6, wherein:

one extremity of each of said locking members is threaded, and said securing means includes a locking element provided with a threaded bore therein for conjugally receiving the threaded extremity of the corresponding locking member therein.

* * * * *